Aug. 31, 1954   T. JENSEN   2,687,877
APPARATUS FOR MIXING AND PROCESSING
Filed July 30, 1951   5 Sheets-Sheet 1
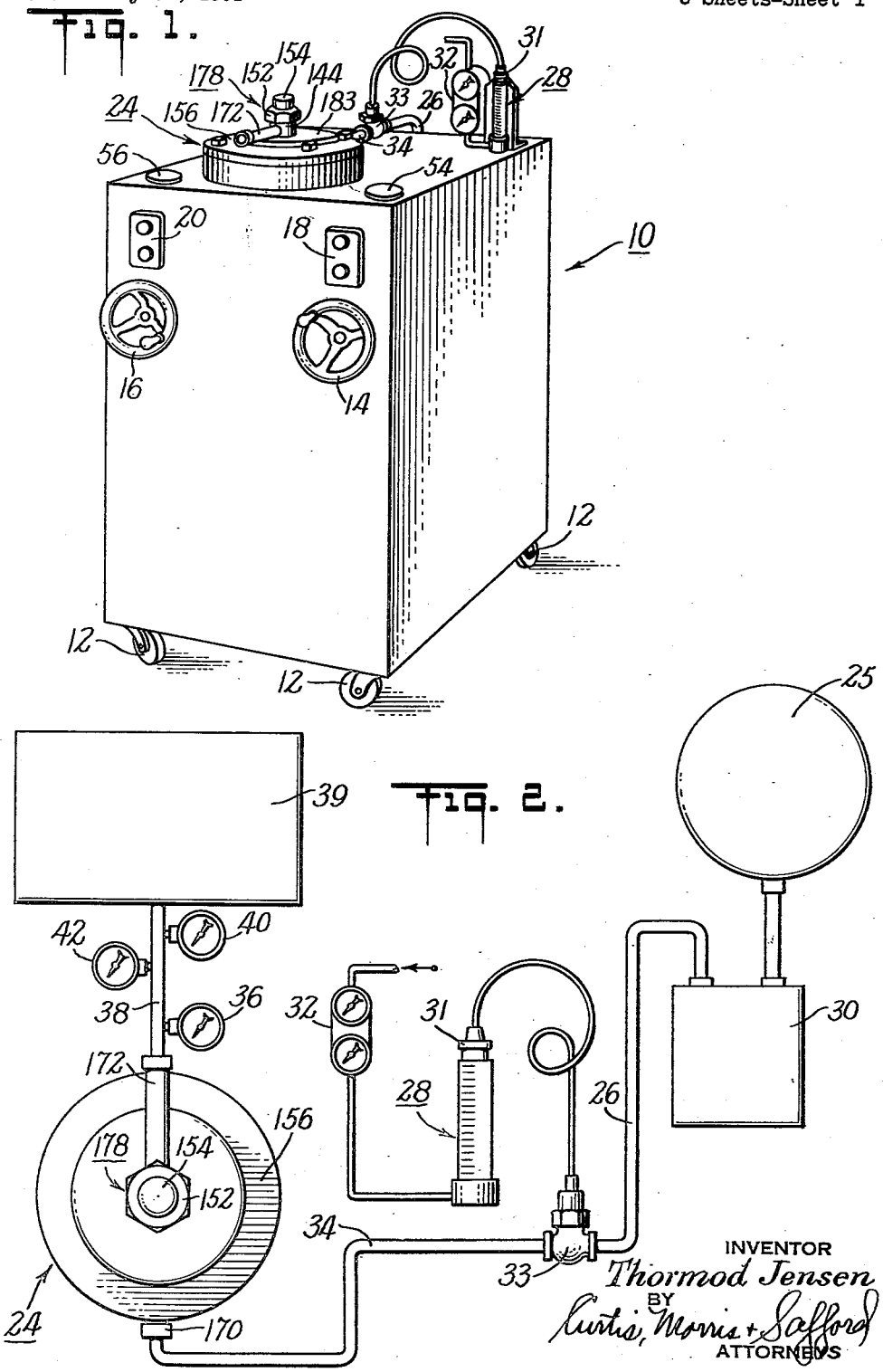
INVENTOR
Thormod Jensen
BY
Curtis, Morris + Safford
ATTORNEYS Aug. 31, 1954  T. JENSEN  2,687,877
APPARATUS FOR MIXING AND PROCESSING
Filed July 30, 1951   5 Sheets-Sheet 2
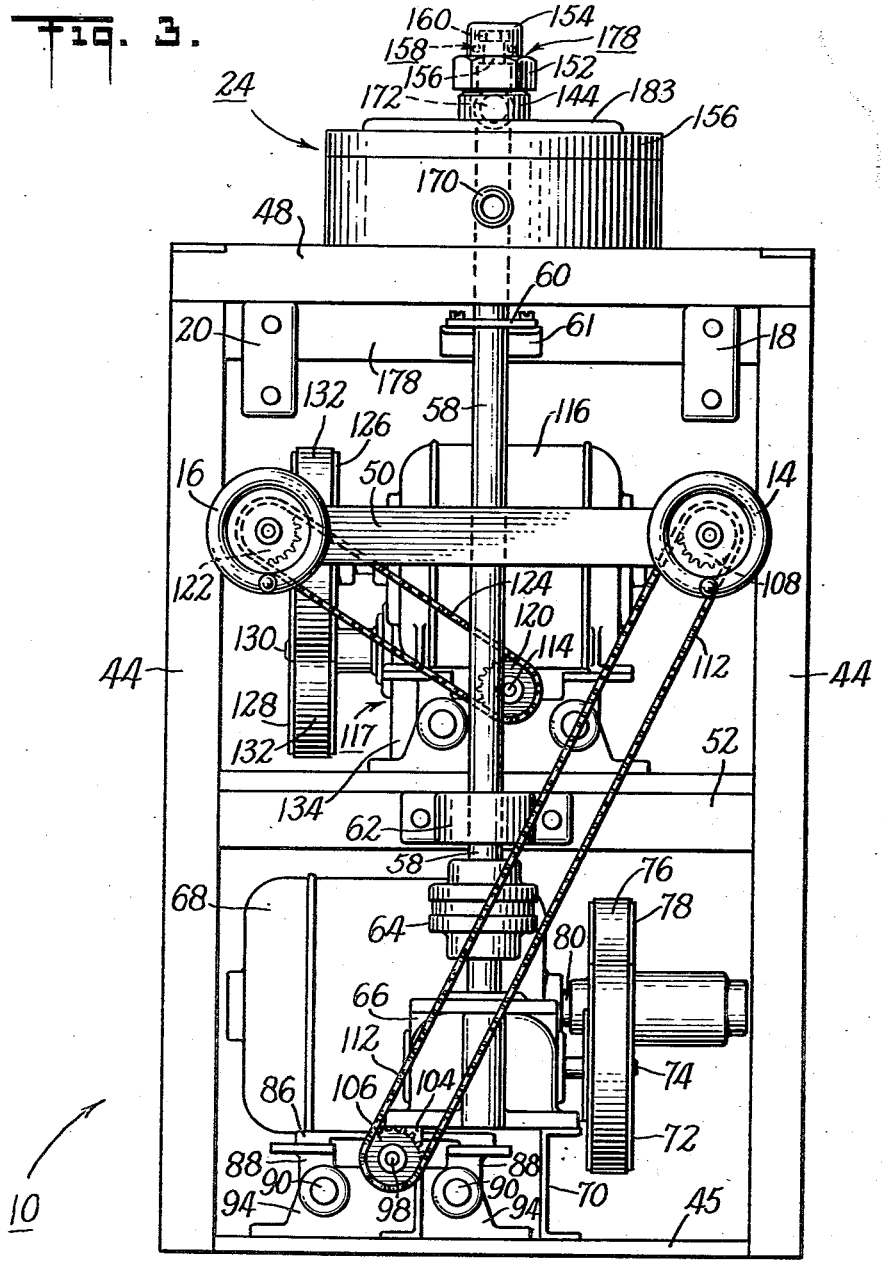
INVENTOR
Thormod Jensen
BY
Curtis, Morris & Safford
ATTORNEYS

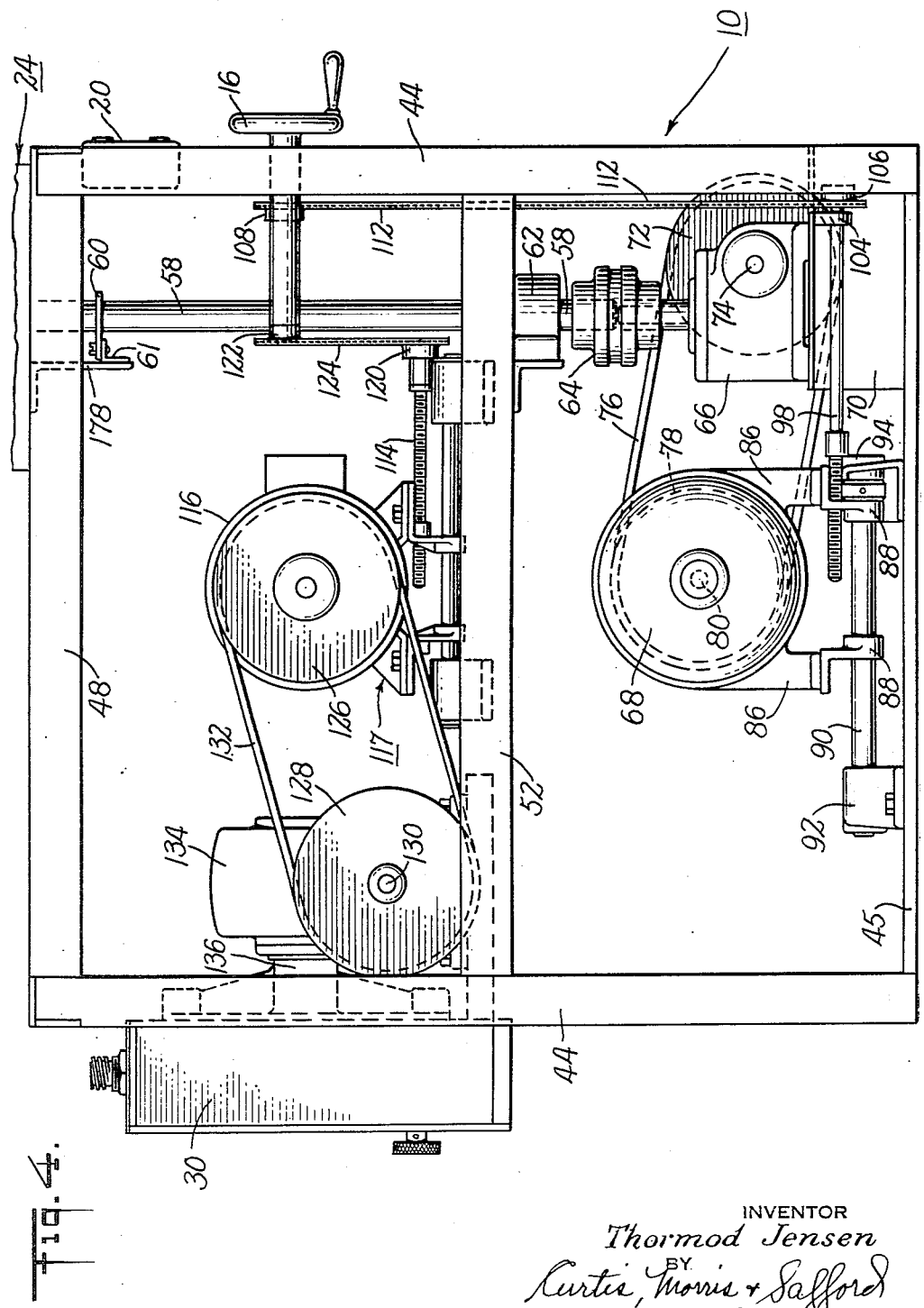

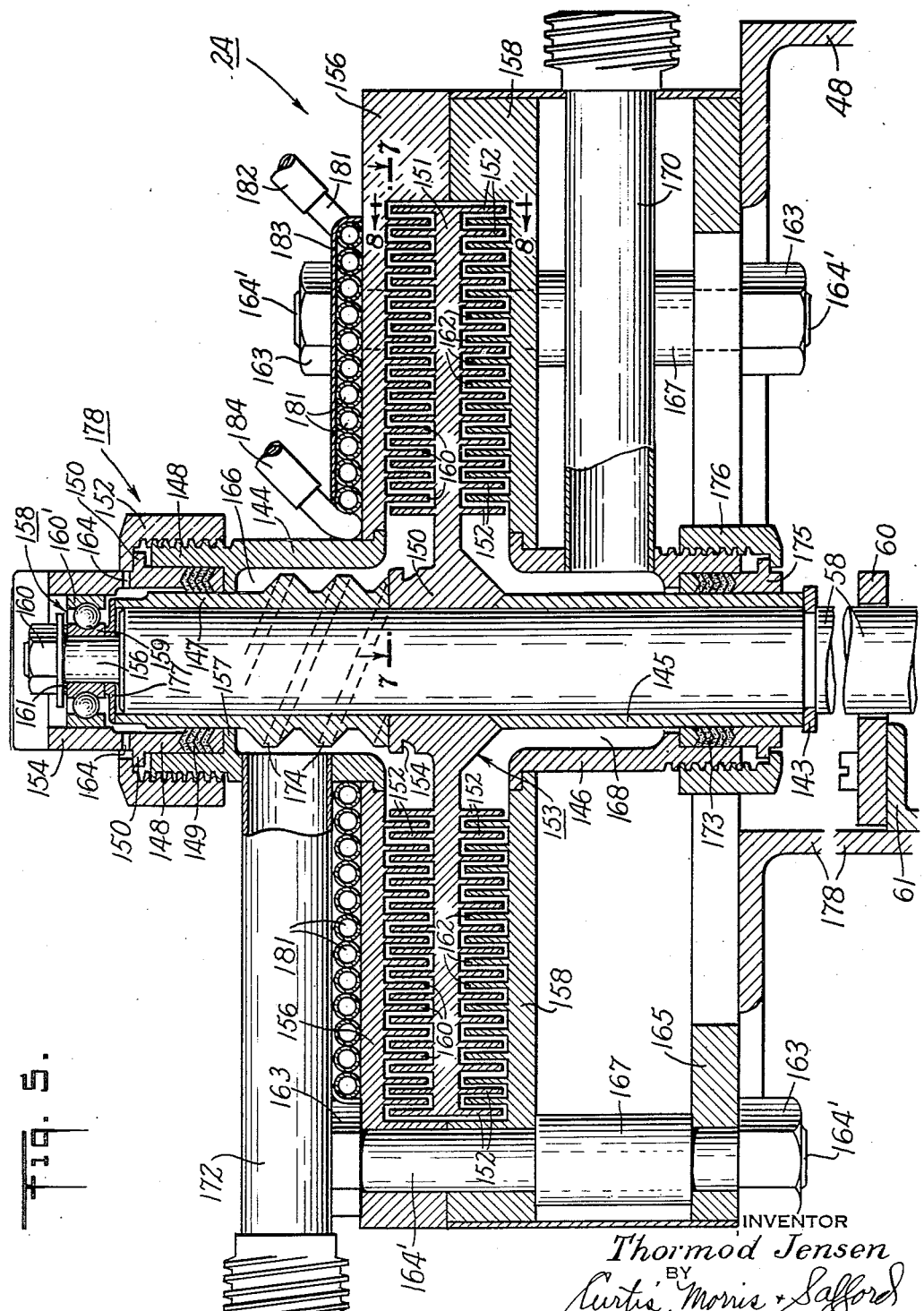

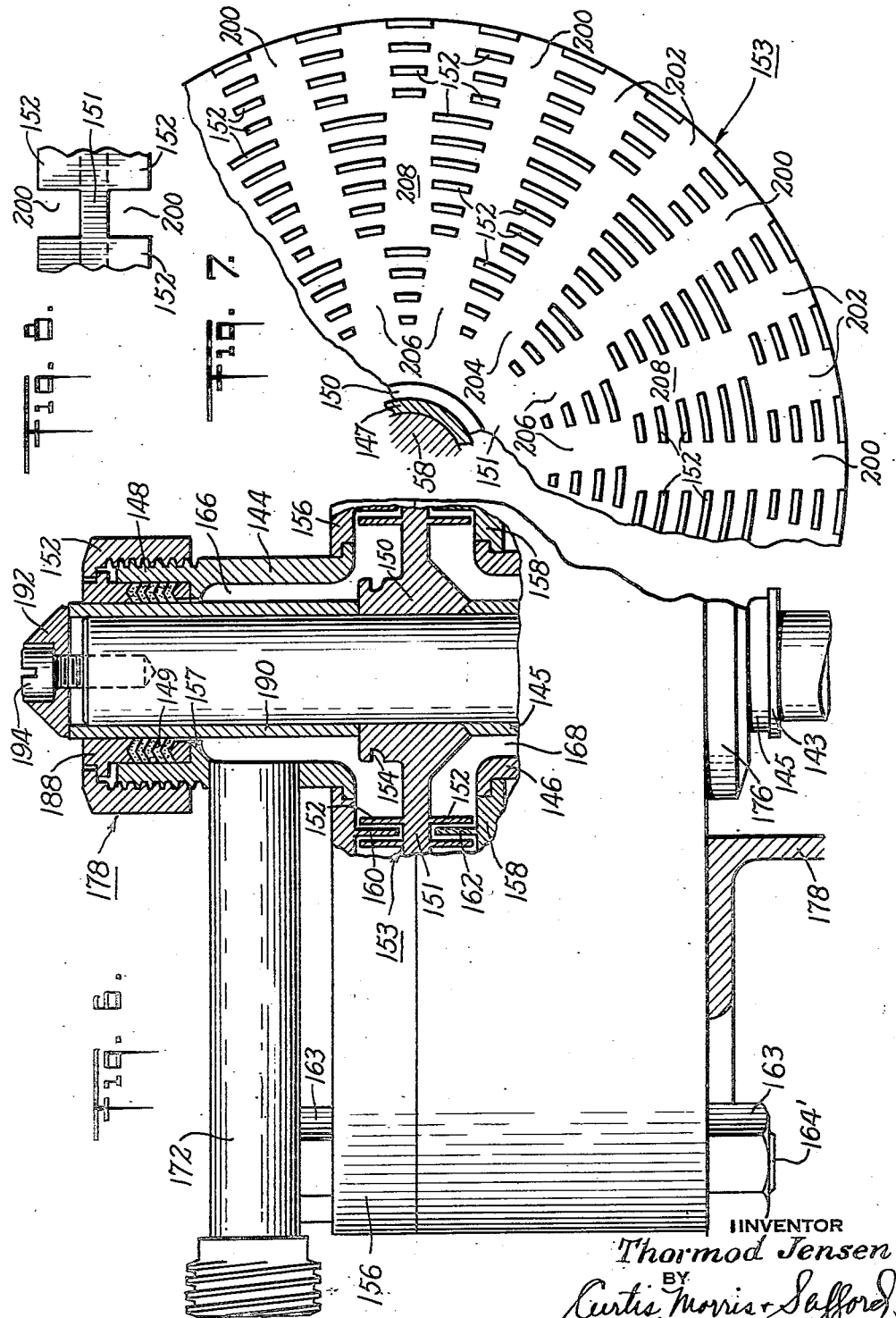

Patented Aug. 31, 1954

2,687,877

UNITED STATES PATENT OFFICE 2,687,877

APPARATUS FOR MIXING AND PROCESSING

Thormod Jensen, Laurelton, N. Y., assignor, by mesne assignments, to E. T. Oakes Corporation, Islip, N. Y., a corporation of New York Application July 30, 1951, Serial No. 239,294

5 Claims. (Cl. 259—8)

This invention relates to an improved mixing machine having the purpose of further mixing and refining a pre-mixed and pre-blended material or medium in order to produce a final mix of extremely excellent and desirable texture.

The invention, and the illustrative apparatus, involve improvements calculated to achieve the desired results, and involve particularly: an improved mixing head; the feeding of an untreated product, such as a pre-blended mix, to the head under controlled pressure; the admission of other constituents such as air or gas to the pre-blended mixture or other product prior to or after entrance into the mixing head; mixing the product, for example, to "foam" it, and to produce a homogeneous product of very excellent and uniform high quality and having the desired cellular structure. By reason of the control of many factors such as, the temperature, the feed pressure, the rates of admission of the product and the gas, and the speed of mixing, a product having a very desirable microscopic cellular structure is obtainable, of a quality that has not heretofore been obtainable in production quantities.

The machine is adaptable to various types of slurries and mixes such as cake batters, toppings, spreads, primary bread ingredients, etc., and so on, and additionally the invention is adaptable to chemical processing, such as, mixing paints, and in latex work involving the formation of foam rubber for pillows, etc. In latex work the machine injects the "zinc" and "gel" at the proper places in the stream, and foams the pre-blended liquid latex to a degree never previously obtained. The process and apparatus involve additional features of novelty as outlined in part in the ensuing objects. In accordance with the foregoing, the primary object of the invention is to provide an improved mixing device and process wherein the pre-blended mix is supplied under pressure to a mixing head with gas being admitted under controlled conditions to the mix as it is fed to the mixing head. A further object is to provide for combined mixing and blending of products of the above character. Another object of the invention is to provide an improved mixing machine of the type having a rotor and stator having mutual interleaving rib members wherein the rotor is removably mounted on its shaft and retained by means of removable sleeve members on opposite sides of the rotor. Another object of the invention is to provide an improved mixing machine of the type as set forth in the foregoing which is readily cleanable, and yet wherein the shaft is journalled in an end bearing and there is provided a seal for the shaft, including a ring member having a part forming a cap for the bearing in which the bearing is floatingly mounted. A still further object is to provide for the above with apparatus which is sturdy in construction, efficient in use, and is adaptable to meet the particular problems encountered in the many fields where it has application.

Another object is to provide a machine wherein it is possible if desired to permit or prevent mixing air into the material being treated, this of course being impossible in the prior styles and types of vertical and horizontal mixing machines.

Further objects and numerous of the advantages of the invention will become apparent from the following detailed description and annexed drawings wherein:

Figure 1 is a general perspective view of the complete machine;

Figure 2 is a schematic diagram illustrating the flow of pre-blended material to the mixing head and the supply of gas to the material being fed to the mixing head;

Figure 3 is a front elevation of the machine partly broken away to illustrate the interior mechanism;

Figure 4 is a side elevation of the machine showing the inner mechanism;

Figure 5 is a sectional view of a preferred form of mixing head utilized in the invention;

Figure 6 is a sectional view of a modified form of mixing head utilized in the invention;

Figure 7 is a partial plan view of the rotor of either Figure 5 or Figure 6.

Figure 8 is a detail sectional view of a part of the rotor of Figure 5 or Figure 6 showing the rib formation.

Referring now to Figure 1 of the drawings, numeral 10 indicates generally the case or housing of the machine which is mounted on casters as shown at 12 so that it can be freely moved about. On the front of the housing are hand wheels 14 and 16, the purpose of which, as will be described, is to adjust the speed of mixing and the pressure of the pre-blended mix being fed to the mixing head. Start and stop switches 18 and 20 are also on the front panel of the housing 10 for controlling the operation of the motors driving the pump and the mixing machine, as will be described. Numeral 24 indicates the mixing head on the top of the machine and the pre-blended mix is fed thereto from a supply tank, as will be described, having reference to Figure 1 and the diagram of Figure 2.

The material is supplied from a pre-mixing tank 25 to the pump 30 and then to a line 26 to which there is connected an air or gas metering device 28 which is of a known type and need not be described in detail. The metering device 28 has a manual adjustment 31 and associated with it is a pressure gauge 32 to indicate the pressure of the gas being supplied to the mix through a valve 33. The mix proceeds through a pipe 34 to the mixing head and the temperature at the mixing head is indicated by a thermometer 36 (Figure 2). A discharge line from the mixing head is indicated at 38 and is connected to a depositor 39 (the details of which are not shown), the final temperature being indicated by thermometer 40 and the fluid pressure in the discharge line is indicated by a pressure gauge 42. A pair of tachometers 54 and 56 indicate the respective speeds of the fluid pump and the rotor of head 24.

Referring now to Figure 3 of the drawings, the housing 10 has upright frame members 44 and transverse frame member 45 as well as transverse members 48, 50 and 52. As previously described, the mixing head 24 is mounted above the top of the housing and supported upon the vertical shaft 58 is the rotor of the mixing head. Beneath the main head the shaft passes through a guide member 60 mounted on an angle bracket 61 on transverse member 48 and the shaft is also journalled in a bearing mounted in pillow block 62 mounted on the transverse member 52. Shaft 58 is coupled at its lower end through a coupling 64 to a speed reduction mechanism 66 which is driven by an electric motor 68.

The arrangements of the drives for the mixing head 24 and pump 30 are shown in greater detail in Figure 4. The gear reduction unit 66 by which the shaft 58 is driven is mounted on a base 70 and it has a pulley 72 on a shaft 74, the pulley being driven through a belt 76 (see Figure 3) from pulley 78 mounted on the shaft 80 of the electric motor 68. Both of the pulleys 72 and 78 are V-pulleys and pulley 78 is of the split type, that is in two parts which are spring-urged together and are adapted to spread apart when the distance between the pulleys is increased, whereby the speed ratio is adjusted by means of moving the motor and the driven element farther apart or closer together.

To effect this speed change the motor 68 has downwardly extending legs 86 (see also Figure 4) having mounting brackets 88 with aligned holes therethrough, these brackets being mounted on horizontal cylindrical rods as shown at 90, whereby the motor can be moved or slid horizontally (to the right or left in Figure 3) by reason of this mounting. The rods 90 are mounted in pedestals 92 and 94, and a screw threaded stem 98 mates with screw threads in the frame of the motor 82 as shown, this stem being mounted in a bearing 104. The rotation of the stem 98 moves the frame 86 and the motor 82 towards and away from the gear train 66, whereby the parts of pulley 78 are lesser or further spread apart and the speed at which the shaft 58 is driven is adjusted as described above.

On the right-hand (Figure 3) end of the shaft 98 is a sprocket wheel 106 which is aligned with another sprocket wheel 108 on the journalled shaft of the hand wheel 14 which is mounted in one of the transverse members 50. Passing over the sprocket wheels 106 and 108 is a chain 112 whereby the adjustment rotation of hand wheel 14 is transmitted to shaft 98 for purposes of adjusting the speed at which the shaft 58 is driven, and the speed is observed in the tachometer 54.

A motor 116 drives the pump 30 the motor having a mounting 117 of the same type as is provided for motor 82, and therefore this mounting will not be again described in detail. Accordingly mounting 117 has a screw threaded stem 114 for adjusting the position of the mounting of the motor, and on the end of this stem is a sprocket wheel 120 aligned with a sprocket wheel 122 mounted on the end of the shaft of the hand wheel 16, this shaft being journalled on the transverse member 50. Passing over the sprocket wheels 120 and 122 is a chain 124 whereby the mounting of motor 116 can be adjusted by turning the hand wheel 16.

The shaft of motor 116 has a pulley 126 thereon which drives pulley 128 mounted on the shaft 130, the drive being by way of a belt 132. The pulley 126 is of the split type spring-urged together as previously described whereby the speed at which the motor drives the driven pulley can be adjusted by adjusting the distance between the pulleys. The shaft 130 of pulley 128 connects to and drives a gear reduction unit 134 which in turn is connected by shaft 136 to drive the pump 30 which pumps the pre-blended mix to the mixing head. The pump 30 is of the type, disclosed in my copending application Serial No. 202,493 filed December 23, 1950 and will not be described in detail here. However, the pump has a flexible tube within which the fluid is confined as it is pumped, and the pumping action is effected by rollers which are mounted upon the pump rotor and which roll along the tube and compress it against an anvil. Thus, the pump delivered the fluid at a constant rate and the rate of delivery is accurately controlled by regulating the speed of the pump rotor.

Referring now to Figure 5 of the drawings which shows the mixing head of Figures 1 to 4, mounted on the drive shaft 58 is the circular head rotor 153 having a hub rigidly clamped to shaft 58 between a top sleeve 147 and a bottom sleeve 145 which rests upon a spring ring or retainer 143 carried by the shaft in an annular slot. The hub 150 has an annular groove 154 of somewhat V-shaped cross-section as shown, which presents a ledge surface for engagement to lift the rotor, thus to lift the rotor away from the bottom stator section. The rotor has a disk-like base portion 151 which has top and bottom annular faces and projecting from each of these faces is a set of fourteen concentric rows of somewhat arcuate teeth or ribs 152. These teeth are formed by first milling each face of the rotor to form concentric annular grooves of $\tfrac{7}{16}$ inch width and thereby leaving annular walls of $\tfrac{7}{16}$ inch thickness. The annular walls are then cut with a one-half inch diameter end mills in accordance with the pattern shown in Figures 7 and 8 which is as follows: Starting at a predetermined radial line of reference, ten radial slots 200 are cut in from the outer periphery of the rotor each through the outer ten annular walls and these cuts are equally spaced so that the center lines are 36° apart. There are then twenty additional cuts 202 made from the outer periphery with two cuts equally spaced between each of the cuts 200; these cuts 202 are therefore 12° apart. Cuts 202 are through the outer four walls so that the rotor now has cuts from its outer periphery with every third cut being longer than the intermediate two. Next, a similar pattern is cut from the inner periphery with five cuts 204 through the inner ten walls spaced from the original radial line of reference starting at 54° counterclockwise from that line, and with ten cuts 206 each through the inner four walls and spaced in pairs intermediate the cuts 204. Finally five cuts 208 are made through the central six walls and these are spaced as shown starting at counterclockwise from the original radial line of reference.

With the rotor thus formed on each face as just described, the rotor has 300 teeth on each face. There are respectively, two stator sections 156 and 158, each of which has a set of teeth 160 and 162, interleaving with the respective sets of rotor teeth. Teeth 160 and 162 are formed in the same manner and in accordance with the same cutting pattern as is used in forming the rotor teeth. However, each stator section has only thirteen concentric walls formed upon it so that the inner row of teeth is not produced and there are only thirteen rows of teeth making a total of 285 teeth on each stator section. With the rotor assembled into the stators there is a radial gap of $\frac{1}{16}$ inch between adjacent teeth and in each row of teeth there is an arcuate gap of one-half inch between teeth. Thus when the rotor is turned the product flows outwardly and passes between the teeth of the successive rows, which form a somewhat labyrinth path for the product, and as it emerges from one row of teeth it is encountered and cut by the teeth of the next row. This insures a very thorough and dependable action, and the product passes through the treating zone in minimum time and with minimum heating.

The stator sections or members are held together by five bolts 164' having nuts 163. These bolts also extend through a bottom plate 165 which is spaced from stator 158 by spacers or collars 167. Welded respectively to the two sections are upwardly and downwardly extending necks 144 and 146. These necks 144 and 146 form annular chambers 166 and 168 around the shaft 58 above and below the rotor 148, and these annular chambers form annular inlet and outlet chambers for material being treated. Illustratively, the lower chamber 168 is the inlet chamber and receives the product through a radial conduit 170 and directs an annular stream of the product in an axial direction upwardly along the shaft to the treatment zone formed in the rotor chamber. Similarly, an outlet conduit 172 connects to the annular chamber 166, and the outgoing product flows in an annular stream along the shaft from the treatment zone and radially outwardly through conduit 172.

The part of sleeve 147 directly above the rotor 148 has formed thereon a double worm formed by two helical ridges or worms 174 which are within chamber 168 and extend slightly above the outlet conduit 172. During operation these ridges blend the outgoing stream of the product; for some operations the ridges are omitted, or they may be formed on the outer surface of shaft 58. The upper end of shaft 58 is sealed by a gland 178, which is formed in the threaded upper part of the neck 144. This portion of the neck is spaced from the periphery of the sleeve 147 and in this annular space are chevron packing rings 149, which rest upon a ledge 151 on the neck. These rings are compressed by a ring member or sleeve 148 having an outwardly extending flange or shoulder 150 which is engaged by an inwardly extending flange or shoulder on a screw threaded ring nut 152 which is tightened onto the threaded neck 144 to urge the sleeve 148 downwardly to compress the packing rings against the ledge 157.

The sleeve 148 has an upstanding cylindrical cap portion 154 forming a closure around the end of the shaft 58. The end 156 of the shaft is of smaller diameter and is threaded, and it is encircled by a bearing 158 the inner race 159 of which is clamped to the shaft by a clamping nut 160 having a washer 161. The bearing 158 has its outer race 160' freely mounted within the cap portion 154 so that the cap portion may slide freely upwardly when nut 160 is removed. However, the end of the shaft is firmly supported through the bearing by the upper portion of the stator. This arrangement at the end of the shaft permits a ready disassembly of the apparatus for cleaning. There are provided in the side walls of the ring member 148 four radially extending pressure relief openings 164 which prevent the building up of pressure which might otherwise result from the escape of some of the product through the seal formed by the chevron packing rings 149. Thus, any escaping product drains out and does not reach the bearing 158. Shaft 58 is also provided beneath the rotor with a bottom shaft seal 173 formed by chevron rings held by a clamping collar 175 which is held in place by a ring nut 176 threaded on to the neck 146.

As indicated above, the lower end of the sleeve 145 engages a spring ring 143 which fits in an annular groove in the shaft 58 and serves to hold the sleeve in place. The sleeve has a beveled upper surface which mates with a surface on the rotor, and the top of the rotor is engaged by the flat bottom surface of sleeve 147 which has at its top a flange washer 177 clamped beneath bearing race 159. Thus, nut 160 clamps the rotor tightly in place and the entire apparatus can be readily disassembled for cleaning by removing the top nuts 163 and the upper stator section, and then unscrewing the clamping nut 160 and removing the bearing 158 and sleeve 147. As indicated above, the rotor is lifted by engaging it at its hub in groove 154, and then the lower stator section may also be lifted. The lifting of the stator section is facilitated by loosening the ring nuts 152 and 176. The stator is supported by a circular member 178 spaced from the shaft 58 and forming part of the frame of the apparatus. Also, bracket 60 is mounted on the frame and surrounds the shaft freely so as to lend guiding support to the shaft when the stator is removed.

From the foregoing, certain aspects of the operation of the apparatus will be readily understood by those skilled in the art. As shown schematically in Figure 2, the pre-blended mix or product is fed from the supply tank to the pump 30 which pumps the product at a controlled rate through the supply conduit 34 to the inlet conduit 170 to the mixing head. The pressure at which the material is fed to the mixing head is controlled to give the desired rate of flow through the machine, and air or another gas is admitted to the material under pressure by the metering valve 28 as described to achieve the desired degree of foaming of the material whereby a very desirable microscopic cellular structure is achieved. The material is fed radially to the annular inlet chamber 168 around the shaft 58 whereby there is uniform distribution to the annular outward flow path formed to the interacting mixing ribs on the rotor 153 and the stator sections 156 and 158. The rotor and stator sections achieve a mixing and kneading of the product to break up particles thereof and to produce the desired texture, and any material which has been added to the product is also broken up and dispersed and is evenly distributed throughout the stream of the product. The main effect of the rotor and stator is a breaking down of large particles to smaller particles, and it has been found that this particular arrangement will produce particles of microscopic structure such as one and one-half microns in diameter as compared to considerably larged particle sizes that it has been possible to produce in the past. After passing through the labyrinth path formed by the rotors and stators, the material passes to the space around the spiral ridges 174 which exerts a blending and kneading action on the product which has an additional effect in producing the desired characteristics as to texture and cellular structure. The material then passes out through the outlet conduit 172.

In the foregoing operation, as previously described the rate at which the product is admitted and the speed of the rotor 153 are accurately adjusted by means of the hand wheels 14 and 16, and the rate of admission of air or other gas through the metering valve can be adjusted. Thus, a final material is produced which is refined and finished to an extremely desirable homogeneous texture before it is delivered to the depositor for panning.

It has been indicated above that it is desirable at times to provide for the control of the temperature of the product being treated. For example, in the embodiment of Figures 1 to 6, if cake, particularly is being processed, it is desirable to provide cooling during the latter portion of the processing. Accordingly, fixed to the top surface of the upper stator section 56 there is a spiral copper tube 181 which has a water inlet opening 184 at the center and a water outlet connection 182 at the outer edge and the tube is enclosed by a sheet metal cover 183. During operation cold water is flowed through this tube at such a rate as to maintain the desired temperature for the product. Under some circumstances a similar heat exchange unit may be provided on the bottom surface of the lower stator section 158. Such is desirable when the product being processed requires accurate temperature control and by passing a heat exchange fluid through the tubes to cool or heat the product such control may be had.

In the illustrative embodiment, the product is passed to the machine rotor through the lower inlet conduit 170 and is withdrawn through the upper conduit 172. For certain materials it is advantageous to provide a reverse flow in which case the spiral ridges 174 will tend to mix the incoming product. However, as has been pointed out above, these ridges may be omitted or they may be provided on the bottom sleeve 145. When latex is being processed, the zinc and gel are added by needles positioned respectively at or near the inner and outer peripheries of the rotor along the side where the flow is radially outwardly.

Referring to Figure 6 of the drawings, another form of mixing head is shown which is similar to that of Figures 1 to 5, corresponding parts being similarly numbered. In this form of the invention, however, the upper sleeve or ring member 188 of the packing gland forms a bearing for the upper end of the shaft 58, there not being provided a ball bearing as in the previous embodiment. In this embodiment the no spiral mixing ridges are utilized, but instead there is simply a smooth sleeve 190 which encircles the shaft 58 and which is retained against the hub of the rotor 153 by a cap 192 clamped in position by a cap screw 194 which is tightened to clamp the rotor to the shaft.

From the foregoing those skilled in the art will observe that I have provided a very effective machine and process whereby various mixes such as batters, etc., can be mixed, kneaded, blended and further refined to an extremely desirable texture and composition superior to any mixes that have previously been known in the past. The refined mixes can be made to yield a greater volume per pound than has been possible in heretofore known refining methods and apparatus, and this is particularly true in connection with cake batters when the cake goes into the oven immediately following refining. The apparatus is superior in that the feeding is uniformly circular at the hub of the machine and the spiral ridges in the preferred embodiment exerts an additional blending action which contributes to the perfection of the final mix. The arrangement of the parts is such as to permit a ready disassembly for cleaning which is desirable and even may be required by law after the processing of every batch or period of use.

In the illustrative embodiment, the pump discussed in my co-pending application Ser. No. 202,493, filed December 23, 1950, has been used and this is admirably suited for use in carrying out the present invention with certain types of materials and products. However, when the product has considerable viscosity or is for other reasons unsuitable for ready passage through the pump here shown, the product may be pumped to the mixing head with another type of apparatus. It should be noted that the rotor shaft is reliably supported with one bearing adjacent its lower end and with another bearing mounted in the top of the stator and therefore above the rotor and adjacent thereto. In both of the illustrative embodiments there may be additional bearing support provided at the packing glands, although it should be understood that the firm support of the upper end of the driving shaft is important in accomplishing certain aspects of the invention. In the embodiment of Figures 1 to 6 the arrangement of the upper bearing and the arrangement for attaching the rotor to the shaft cooperates in providing an extremely practical and superior construction. The particular arrangement of the rotor and stator teeth is also important particularly in cooperation with the other features of the apparatus. During operation the incoming stream of the product encounters the inner row of rotor teeth and is somewhat impacted thereby. It then flows through this row and successively to and through the rows of rotor and stator teeth. The openings through the teeth in each row is sufficient to permit a rapid flow; and there is no zone of restriction, with the result that the rate of flow is substantially constant throughout the treatment zone and the entire unit works at maximum efficiency.

The foregoing is illustrative of preferred embodiments of my invention and it is to be understood that various alternatives and modifications may be adopted by those skilled in the art and it is intended that such alternatives and modifications be encompassed within the scope of the claims appended hereto.

I claim:

1. In a continuous mixing device of the type described having a rotor member mounted upon a rotor shaft and stator means, the rotor and stator means having spaced annular elements which interleave with each other to form a labyrinth path of flow, the combination therewith of means comprising an extending neck on said stator means forming an annular chamber around the shaft communicating with the said path of flow upstream from said rotor, means for feeding medium to be mixed to the annular chamber, said shaft having screw type mixing means formed thereon downstream from said rotor, and means forming a chamber around said screw type mixing means in the path of flow whereby a blending action is exerted on the medium being treated.

2. In a continuous mixing machine of the character described, in combination, a rotatable shaft having a driving end and a supported end, a housing including a stator having said shaft extending therein, a rotor fixed to said shaft within said housing, a shaft seal having a collar, said collar having an extending collar portion, a bearing removably mounted on the collar portion on the opposite side of said seal from said rotor and supporting said supported end of said shaft.

3. Apparatus as described in claim 2 wherein said bearing has an inner race clamped to the end of said shaft and an outer race secured to said collar portion, and means clamped by said inner race of said bearing and holding said rotor to said shaft.

4. In a continuous mixing device of the character described, in combination, means comprising a rotor and at least one stator having interleaving circularly arranged members forming a labyrinth path of flow, a shaft for said rotor, one stator having a hub including an extending neck portion spaced from said shaft and forming an annular space therewith, means forming a seal between the outer end of said shaft and said neck portion, and screw type mixing means on and rotatable with said shaft and located in said annular space between said rotor and said seal for exerting a blending action action on material being processed.

5. The apparatus set forth in claim 2 comprising means between said seal and said bearing for venting any material escaping past said seal before it can enter said bearing.

References Cited in the file of this patent

UNITED STATES PATENTS

| Number | Name | Date |
|---|---|---|
| 1,133,968 | Jackson | Mar. 30, 1915 |
| 1,466,639 | Browne | Aug. 28, 1923 |
| 1,529,874 | Culbertson | Mar. 17, 1925 |
| 1,585,169 | Perkins et al. | May 18, 1926 |
| 1,670,593 | Miller | May 22, 1928 |
| 1,941,808 | McConnaughay | Jan. 2, 1934 |
| 2,077,228 | De Bethune | Apr. 12, 1937 |
| 2,132,364 | Thompson | Oct. 4, 1938 |
| 2,169,338 | Ditto | Aug. 15, 1939 |
| 2,211,387 | Routh | Aug. 13, 1940 |
| 2,248,938 | Bennett | July 15, 1941 |
| 2,292,634 | Hansen | Aug. 11, 1942 |
| 2,477,204 | Ravine | July 26, 1949 |
| 2,478,893 | Brant | Aug. 16, 1949 |